United States Patent
Fang et al.

(10) Patent No.: US 12,436,871 B2
(45) Date of Patent: Oct. 7, 2025

(54) OBJECTIVE-DRIVEN TEST CASES AND SUITES

(71) Applicant: International Business Machines Corporation, Armonk, NY (US)

(72) Inventors: Wu Song Fang, Beijing (CN); Xin Zheng, Beijing (CN); Ji Dong Li, BeiJing (CN); Shan Shan Cai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 17/584,679

(22) Filed: Jan. 26, 2022

(65) Prior Publication Data

US 2023/0236956 A1    Jul. 27, 2023

(51) Int. Cl.
*G06F 11/36*      (2025.01)
*G06F 11/3668*    (2025.01)

(52) U.S. Cl.
CPC ........ *G06F 11/3684* (2013.01); *G06F 11/368* (2013.01)

(58) Field of Classification Search
CPC ........................... G06F 11/368; G06F 11/3684
USPC ...................................................... 717/124
See application file for complete search history.

(56) References Cited

U.S. PATENT DOCUMENTS

| | | | |
|---|---|---|---|
| 9,779,013 B2 | 10/2017 | Narayan et al. | |
| 10,241,898 B2 | 3/2019 | Agrawal | |
| 10,768,893 B2 | 9/2020 | Misra et al. | |
| 2015/0113510 A1 | 4/2015 | Doshi et al. | |
| 2017/0199810 A1* | 7/2017 | Hamilton, II | G06F 11/3684 |
| 2020/0285569 A1 | 9/2020 | Tung et al. | |
| 2020/0379888 A1 | 12/2020 | Mentre et al. | |
| 2022/0091968 A1* | 3/2022 | Kumar | G06F 11/3698 |
| 2022/0404196 A1* | 12/2022 | Chen | H04R 1/04 |
| 2023/0251960 A1* | 8/2023 | Sharma | G06N 5/04 717/124 |

FOREIGN PATENT DOCUMENTS

CN         106959920 A       7/2017

* cited by examiner

*Primary Examiner* — Hanh Thi-Minh Bui
(74) *Attorney, Agent, or Firm* — Cantor Colburn LLP; Edward Wixted

(57) ABSTRACT

An objective-driven test case generation system includes an atomic test case module, a test data module, a tailoring module and a functional test case module. The atomic test case module generates a plurality of atomic test cases and stores the atomic test cases in an atomic test case library. The test data module receives a business model, determines one or more test steps from the input business model, and generates test data including the test steps. The tailoring module performs a linking operation to link the test steps included in the test data with one or more atomic test cases included in the atomic test case library to generate linked test case data. The functional test case module generates an objective-driven functional test case based on the linked test case data.

17 Claims, 11 Drawing Sheets

OBJECTIVE-DRIVEN TEST CASES AND SUITES

BACKGROUND

The present invention generally relates to software and application testing, and more specifically, to a system and method for building objective-driven test cases and test suites.

Testing of software and applications involves performing various types of testing operations that have proven to be expensive and time-consuming. The testing operations perform include unit testing (UT) and functional verification testing (FVT). Unit testing is first level of testing done before integration testing, and typically involves testing individual units or components of software or an application. Unit testing typically includes isolating sections of code to verify its correctness, i.e., to validate that each unit (e.g., an individual function, method, procedure, module, or object) of the software code performs as expected.

Functional verification testing (also referred to simply as "functional testing") is a quality assurance process and a type of "black-box" testing that bases its test cases on the specifications of the software component under test. Functions are tested by feeding them an input and examining the output. Functional testing is conducted to evaluate the compliance of a system or component with specified functional requirements. Therefore, the internal program structure of the software code or application is typically not considered when performing functional testing.

SUMMARY

According to a non-limiting embodiment, an objective-driven test case generation system includes an atomic test case module, a test data module, a tailoring module and a functional test case module. The atomic test case module generates a plurality of atomic test cases and stores the atomic test cases in an atomic test case library. The test data module receives a business model, determines one or more test steps from the input business model, and generates test data including the test steps. The tailoring module performs a linking operation to link the test steps included in the test data with one or more atomic test cases included in the atomic test case library to generate linked test case data. The functional test case module generates an objective-driven functional test case based on the linked test case data.

According to another embodiment, a method of generating an objective-driven test case comprises generating by an atomic test case module a plurality of atomic test cases and storing the atomic test cases in an atomic test case library, and inputting a business model to a test data module. The method further comprises determining by the business model one or more test steps from the input business model and generating by the business model test data including the test steps. The method further comprises performing, by a tailoring module in signal communication with the atomic test case module and the test data module, a linking operation to link the test steps included in the test data with one or more atomic test cases included in the atomic test case library to generate linked test case data. The method further comprises generating, by a functional test case module in signal communication with the tailoring module, the objective-driven functional test case based on the linked test case data.

According to yet another non-limiting embodiment, a computer program product is provided to control a processor to generate an objective-driven test case. The computer program product comprises a computer readable storage medium having program instructions embodied therewith. The program instructions are executable by an electronic computer processor to control the processor to perform operations comprising generating, by an atomic test case module, a plurality of atomic test cases and storing the atomic test cases in an atomic test case library. The operation further include inputting a business model to a test data module. The operation further include determining by the business model one or more test steps from the input business model and generate by the business model test data including the test steps. The operations further including performing, by a tailoring module in signal communication with the atomic test case module and the test data module, a linking operation to link the test steps included in the test data with one or more atomic test cases included in the atomic test case library to generate linked test case data. The operations further include generating, by a functional test case module in signal communication with the tailoring module, the objective-driven functional test case based on the linked test case data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
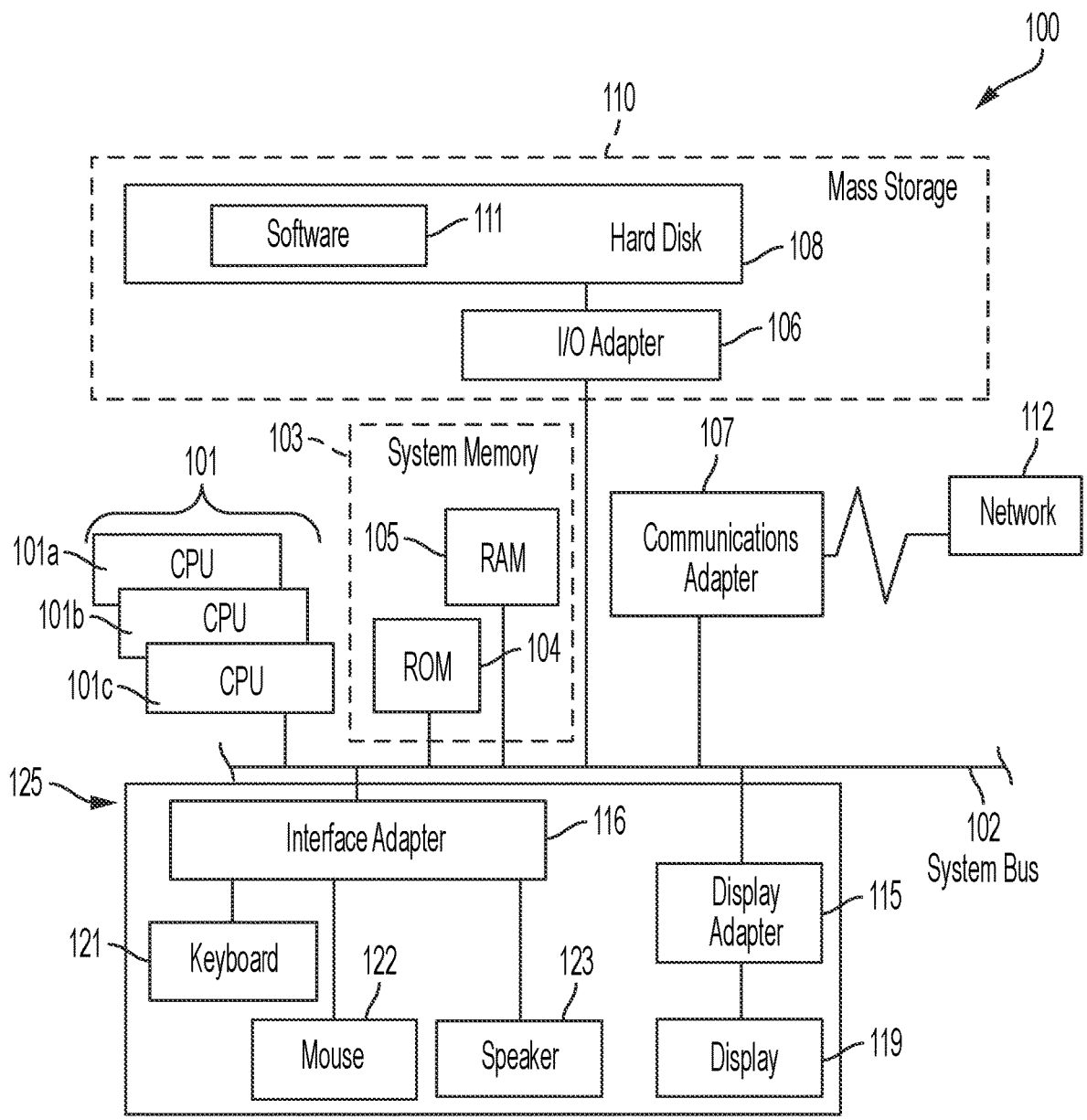
FIG. 1 depicts a block diagram of an example computer system for use in conjunction with a non-limiting embodiment of the present disclosure.

The diagrams depicted herein are illustrative. There can be many variations to the diagrams or the operations described therein without departing from the spirit of the invention. For instance, the actions can be performed in a different order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Due to the long development cycle and large volume of some projects, the number of test cases is also very large. A high-level functional verification testing (FVT) plan is typically created at the beginning of a test cycle, which outlines an agreement between the development team, project management team, and the FVT team on test coverage and scope. However, the current working mode found in multi-person collaborative development environments typically involves developers adding new test cases without considering the possibility of reusing existing test cases. The continued addition of new test cases leads to a bloated test process, which greatly prolongs the integration test time. In complex business scenarios, test functions are interdependent, and test cases written by different personnel may have many repeated operations, which causes inefficient use of system resources and substantially reduces the speed and efficiency of testing.

One or more non-limiting embodiments addresses the shortcomings of conventional unit testing (UT) and FVT by providing an objective-driven functional test case generation system configured to build objective-driven functional test cases and test suites. The objective-driven functional test case generation system described herein is capable increasing the reuse rate of test cases and the efficiency of test execution, while reducing the effort required to create test cases larger test case suites.

According to one or more non-limiting embodiments of the present disclosure, the objective-driven test case generation system is capable of implementing an objective-driven test case generation system configured to generate and adjust objective-driven functional test cases and test suites. The objective-driven test case generation system can execute a workflow including a sequence of workflow process including, but not limited, automatically generating standard test cases, dynamically selecting test cases, generating large test suites, and executing the test suites to verify defined goals and dynamically adjust the test suite to achieve the defined goals. In one or more non-limiting embodiments, the standard test cases can be generated by scanning source code and unit test cases to form a general test case library. A test case can then be dynamically selected from the case library according to a targeted test coverage and targeted test scope. The large test suites can be generated by combining defined goals and verification points to form small-sized or individual objective-driven functional test cases. These individual test cases can then be encapsulated together to generate the larger objective-driven functional test case suites. The test suite can then be executed the results used to reverse verify (i.e., confirm) that the defined goals and verification points are achieved. One or more of the individual objective-driven functional test cases can be automatically adjusted to refine the objective-driven test case suite and achieve the overall goals and verification points.

FIG. 1 depicts a block diagram of an example computer system 100 for use in conjunction with one or more embodiments of the present disclosure. The computer system 100 can operate as a special purpose objective-driven test case generation system 400 capable of automatically generating objective-driven test functional cases that can be collected, organized and stored in memory to build objective-driven functional test suites. Accordingly, the computer system 100 described herein is capable increasing the reuse rate of test cases and the efficiency of test execution, while reducing the effort required to create test cases larger test case suites.

The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. The keyboard 121, a mouse 122, a speaker 123, interface adapter 116, display 119, and display adapter 115 can be collectively referred to as an I/O interface 125 or graphical user interface GUI 125. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
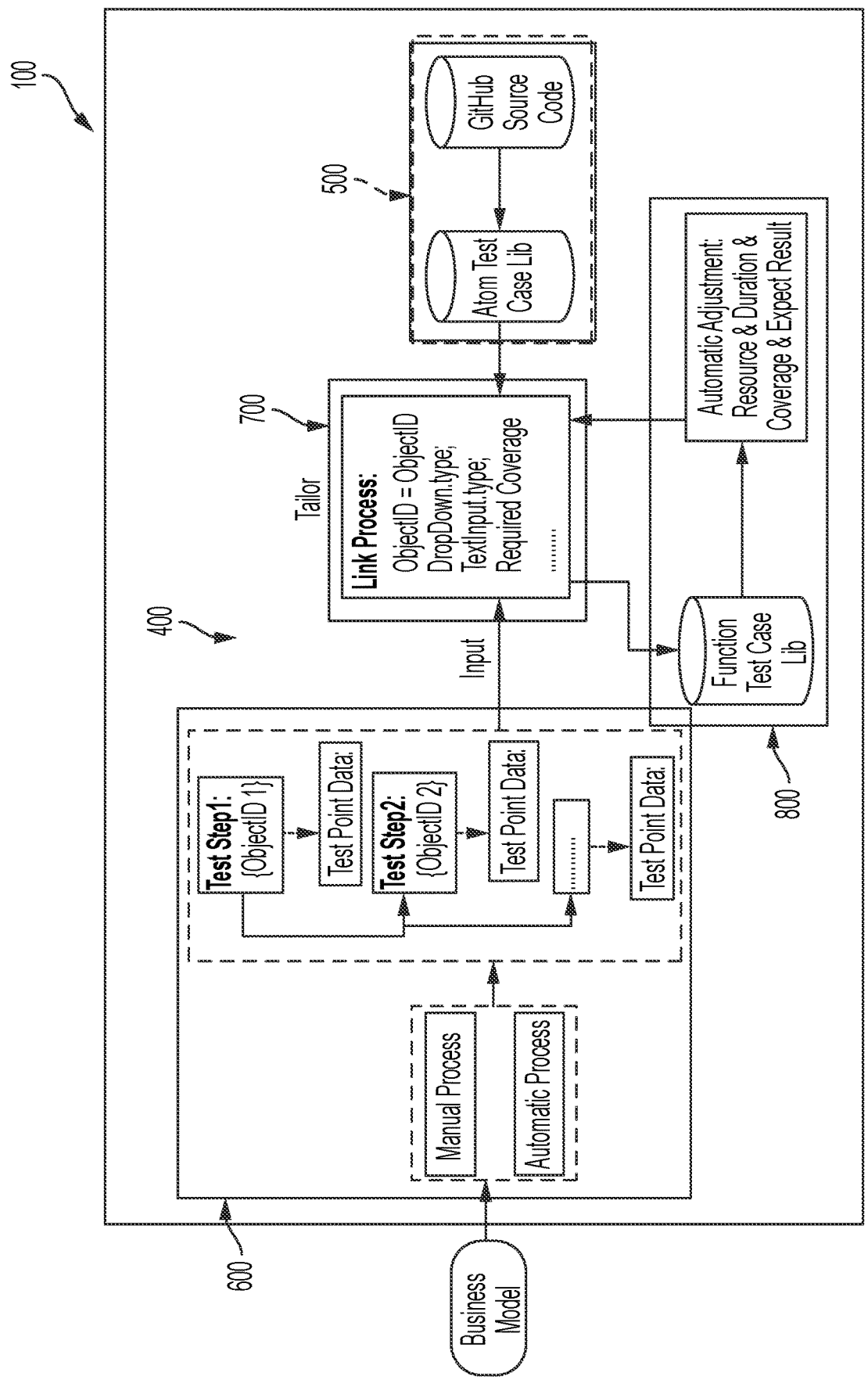
FIG. 2 is a block diagram illustrating an objective-driven test case generation system according to a non-limiting embodiment of the present disclosure.

With reference now to FIG. 2, an objective-driven test case generation system 400 is illustrated according to a non-limiting embodiment of the present disclosure. The objective-driven test case generation system 400 includes an atomic test case module 500, a test data module 600, a tailoring module 700, and a functional test case module 800. Any one of the atomic test case module 500, the test data module 600, the tailoring module 700, and the functional test case module 800 can be constructed as an electronic hardware controller that includes memory and a processor configured to execute algorithms and computer-readable program instructions stored in the memory. In one or more non-limiting embodiments of the invention, the atomic test case module 500, the test data module 600, the tailoring module 700, and the functional test case module 800 are all be embedded or integrated in a single controller.

As described herein, the modules 500-800 of the objective-driven test case generation system 400 can operate together to generate a workflow that performs a sequence of processes for automatically building objective-based test cases according to a non-limiting embodiment of the present disclosure. The processes include a first process for generating a standard atomic test case, a second process for generating test data including one or more test steps, a third process for tailoring (e.g., linking or merging) the test steps with an atomic test case to generate linked test case data, and a fourth process for generating and updating an objective-driven functional test case based on the linked test case data. Accordingly, each process can be performed by a dedicated processor 500-800 that is included in the objective-driven test case generation system 400. In some non-limiting embodiments, it should be appreciated that one or more of the processes 500-800 can be combined in a single processor without departing from the scope of the invention.

Figure 3:
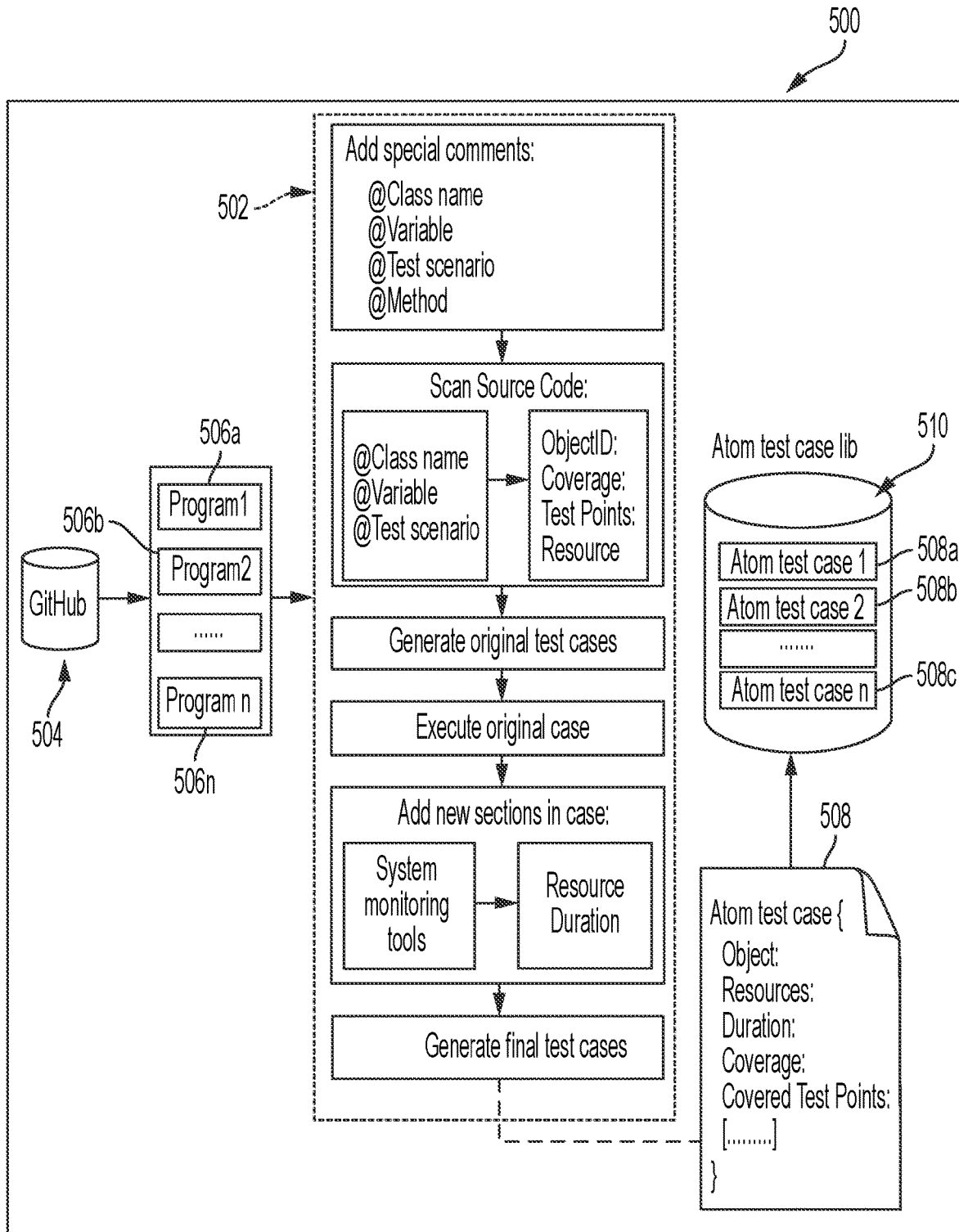
FIG. 3 is a block diagram of an atomic test case module configured to generate a standard atomic test case according to a non-limiting embodiment of the present disclosure.

Turning now to FIG. 3 an atomic test case module 500 configured to generate an atomic test case is illustrated according to a non-limiting embodiment of the present disclosure. The atomic test case module 500 includes an atomic test case engine 502 in signal communication with a shared software database 504 (e.g., GitHub). The shared software database 504 includes one or software programs and/or applications (collectively referred to as programs 506) that can be shared and collaborated among a plurality of individual users, developers and/or software testers.

The atomic test case engine 502 is configured to obtain a program 506 from the shared software database 504, and perform one or more atomic test case processing operations on the source code of the program 506 to ultimately generate an atomic test case 508. The atomic test case processing operations include, but are not limited to, adding to the source code annotations (e.g., a class name (e.g., ClassA, ClassB . . . ClassN), a variable name, a test scenario identifier (ID), and a method ID), wherein the class name can be mapped to an object (ObjectID) of a corresponding test step associated with a business model; scanning the source code to determine code annotations, generating one or more atomic test case goals and/or verification points (e.g., an object identifier (Object ID), a coverage ID, one or more test points, resource ID, etc.), generating an original atomic test case based on the atomic test case goals and/or verification points, executing the original atomic test case, supplementing the original atomic test case with new verification conditions, goals and/or verification points (e.g., system monitoring tools and resource duration), and generating a final standard atomic test case data that includes the verification conditions, test case goals and/or verification points (e.g., the object ID, the coverage ID, the test points, the system monitoring tools, the resource ID, the resource duration, etc.).

As described herein, the atomic test case engine 502 utilizes the final standard atomic test case data to generate the atomic test 508 and store it in an atomic test case library 510. In one or more non-limiting embodiments, the atomic test case engine 502 is configured to perform the atomic test case processing operations on a plurality of programs 506a-506n obtained from the shared software database 504 to populate the atomic test case library 510 with a plurality of finalized standard atomic test cases 508a, 508b, 508n (referred to in general as a standard atomic test 508). Accordingly, the atomic test case library 510 can store different types of atomic test cases 508 (e.g., atomic test cases with different goals and/or verification points) that can be utilized to generate one or more objective-driven functional test cases as described in greater detail below.

Figure 4:
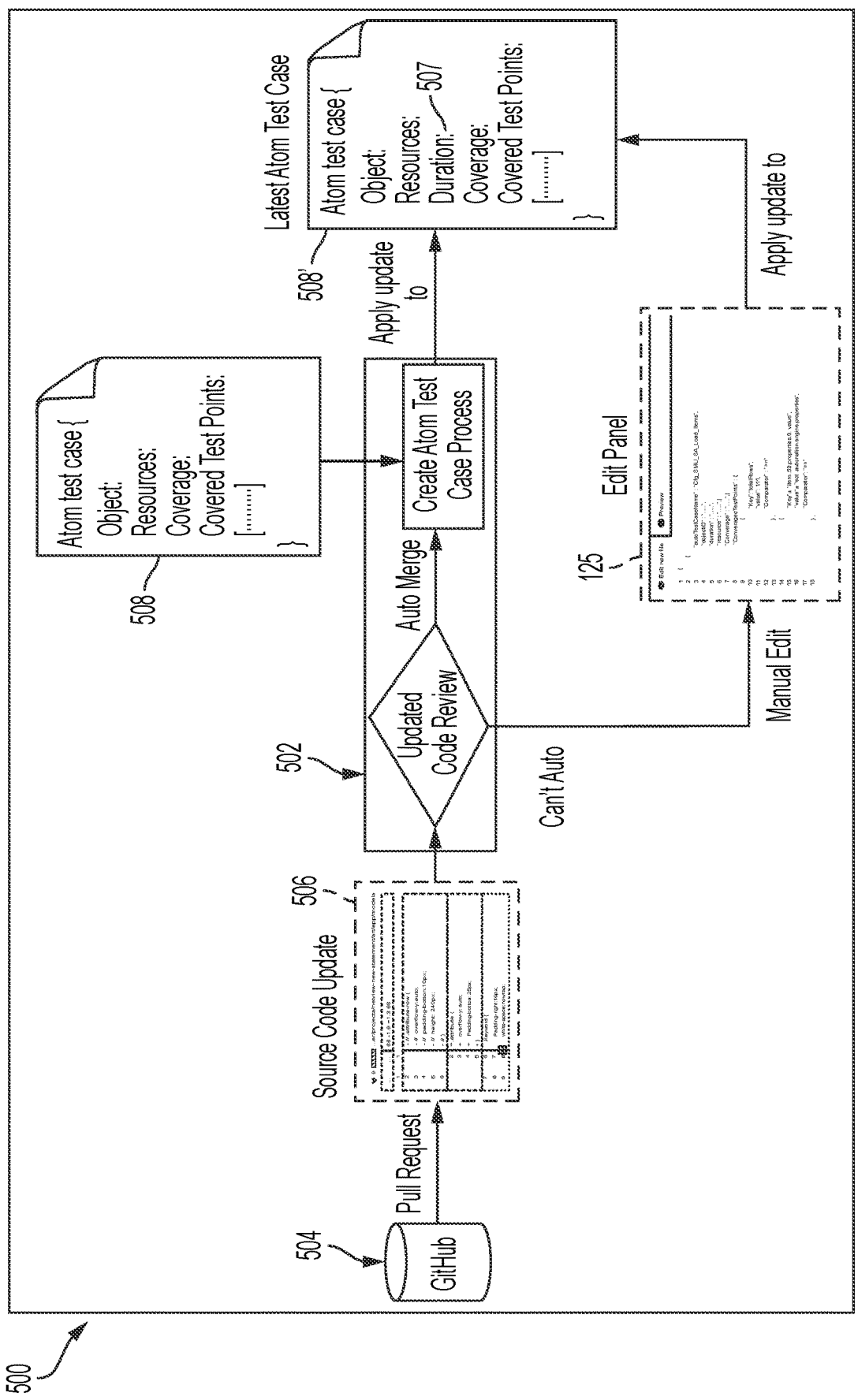
FIG. 4 is a block diagram of a test data module configured to generate an atomic test case according to a non-limiting embodiment of the present disclosure.

The atomic test case module 500 is also configured to perform an automated atomic test case updating process. Turning to FIG. 4, for example, a workflow process performed by the atomic test case module 500 to perform an automated atomic test case updating process is illustrated according to a non-limiting embodiment of the present disclosure. The operations of the automated atomic test case updating process include, for example, obtaining a target program 506 (e.g., selected by a user) from the shared software database 504, analyzing (e.g., by the atomic test case engine 502) the source code of the target program 506 to detect one or more updated code segments or updated code annotations (e.g., an updated class name, an updated variable name, an updated test scenario ID, an updated method ID, etc.) and determining (e.g., by the atomic test case engine 502) one or more updated atomic test case goals and/or updated verification points. The updated atomic test case goals and/or updated verification include, but are not limited to, an updated object identifier (ObjectID), an updated coverage identifier (CoverageID), one or more updated test points, and an updated resource identifier (ResourceID). In one or more non-limiting embodiments, the more updated atomic test case goals and/or updated verification points are determined automatically by the atomic test case engine or are manually determined by a user and input using an I/O interface 125.

In addition to analyzing the source code, the atomic test case engine 502 receives an initial atomic test case having a class name (ClassN) that corresponds to one or more objects (ObjectID) included the program 506. Once the corresponding atomic test case 508 is obtained, the atomic test case engine 502 applies the updated atomic test case goals and/or updated verification points 507 to the initial atomic test case 508 to generate an updated standard atomic test case 508'. The updated atomic test case goals and/or updated verification points 507 can be automatically applied by the atomic test case engine or can be manually applied to the corresponding standard atomic test case 508 by a user that operates an I/O interface 125 of the system 100. The atomic test case engine 502 then replaces the previous atomic test case 508 with the updated standard atomic test case 508' in the atomic test case library 510.

Figure 5:
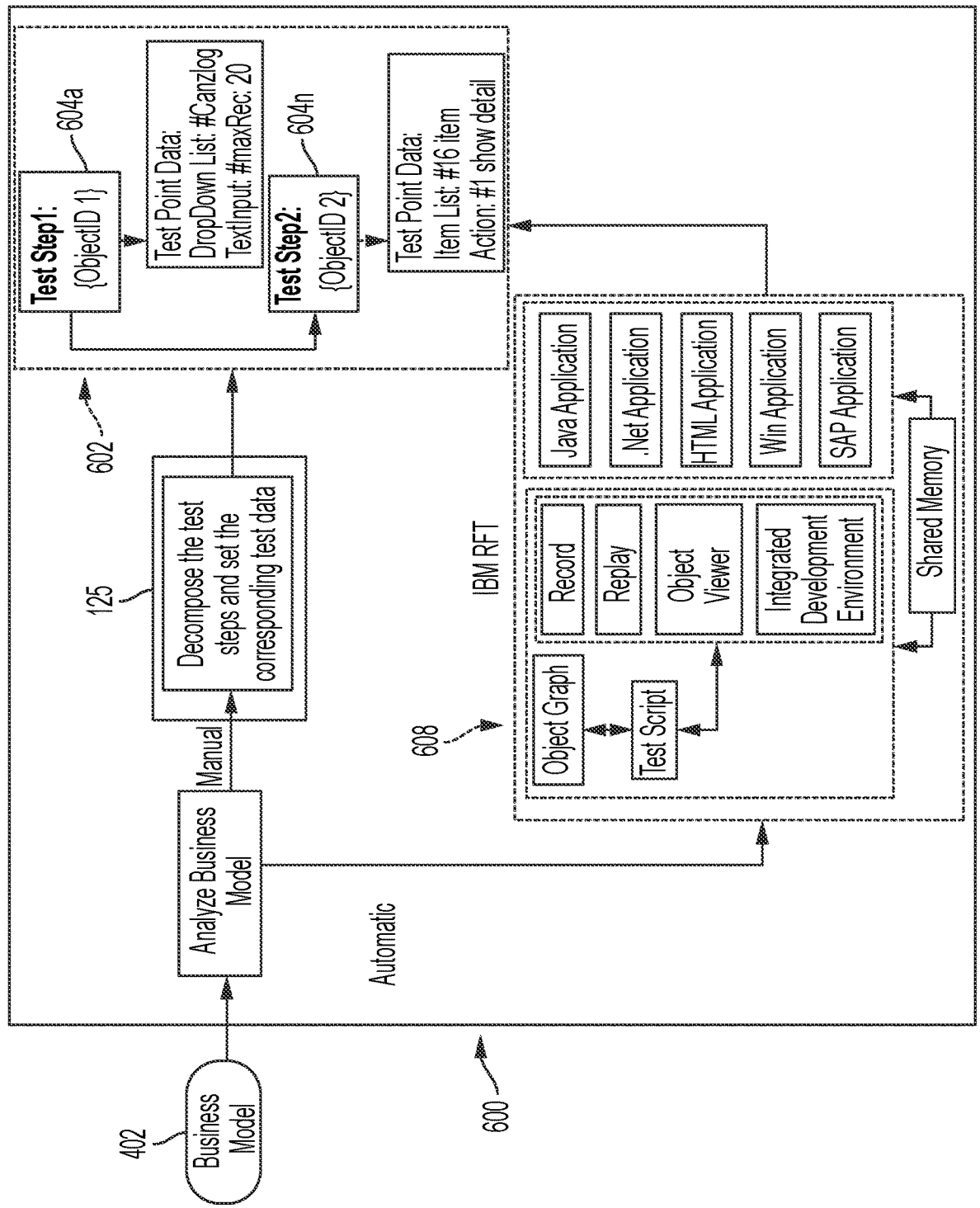
FIG. 5 is a block diagram of a test data module included in the objective-driven test case generation system according to a non-limiting embodiment of the present disclosure.

Turning to FIG. 5, the test data module 600 is illustrated according to a non-limiting embodiment of the present disclosure. The test data module 600 is configured to receive a business model 402 (e.g., input by a user), analyze the input business model, determine one or more test steps 604a-604n in response to analyzing the input business model 402, and generate test data 606 including the test steps 604a, 604b, 604n (referred to in general as a test step 604). Each test step includes test point data and corresponds to a respective object indicated by an ObjectID. The test point data of a respective test step includes but is not limited to, a dropdown list, text input, an item list, and an action.

The test data module 600 includes a functional test engine 608 configured to determine the test steps 604a-604n and generate the test data 606 in response to performing one or more automated testing operations. The automated testing operations include, but are not limited to, functional testing operations, regression testing operations, graphic user interface (GUI) testing operations, and data-driven testing operations. In one or more non-limiting embodiments of the invention, the test data module 600 generates the test data based on the test steps input to the I/O interface 125. In other embodiments of the present disclosure, a user determines the test steps and inputs the test steps to the test data module 600 using the I/O interface 125.

Figure 6A:
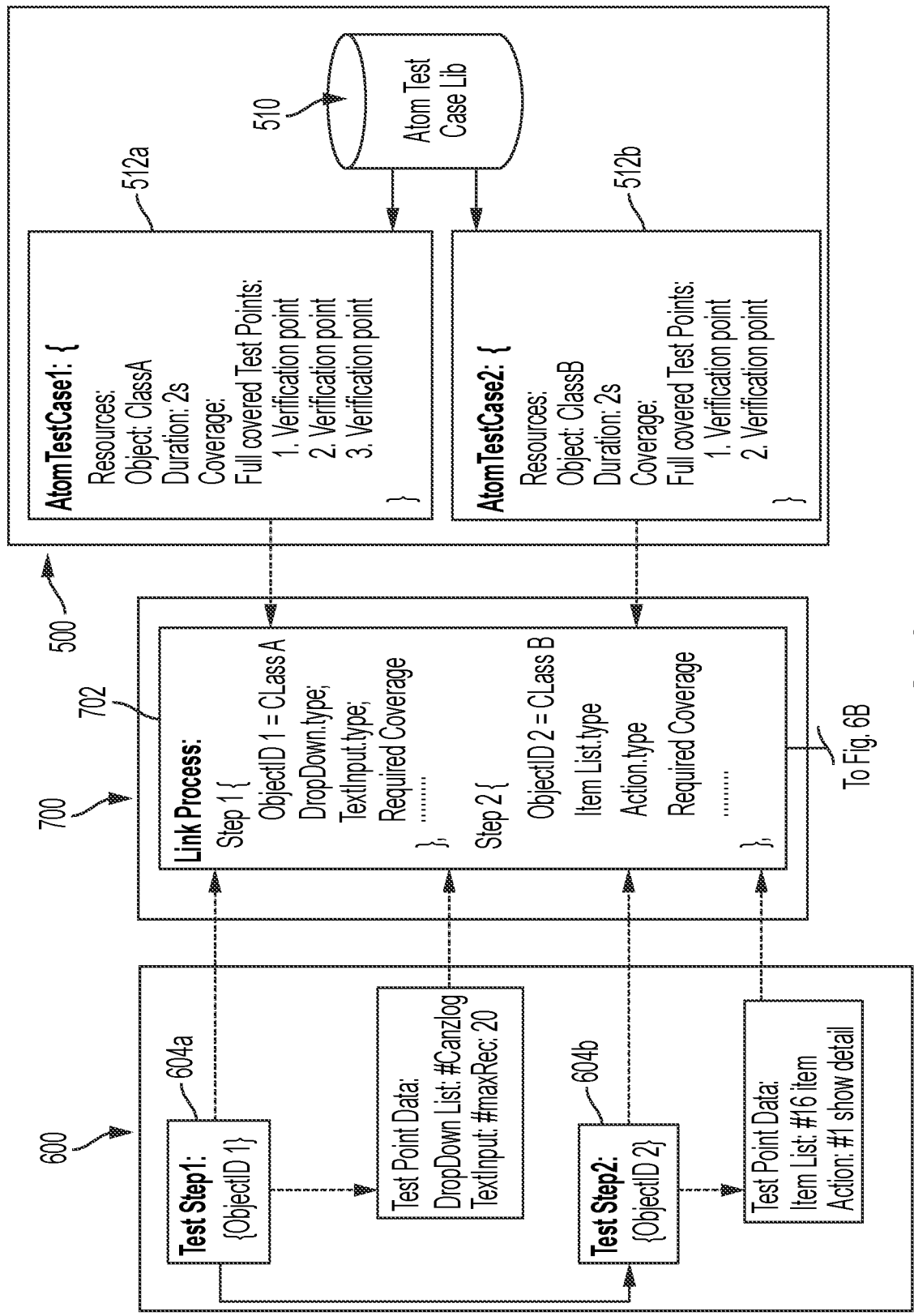
FIG. 6A illustrates a tailoring module included in the objective-driven test case generation system according to a non-limiting embodiment of the present disclosure.
Figure 6B:
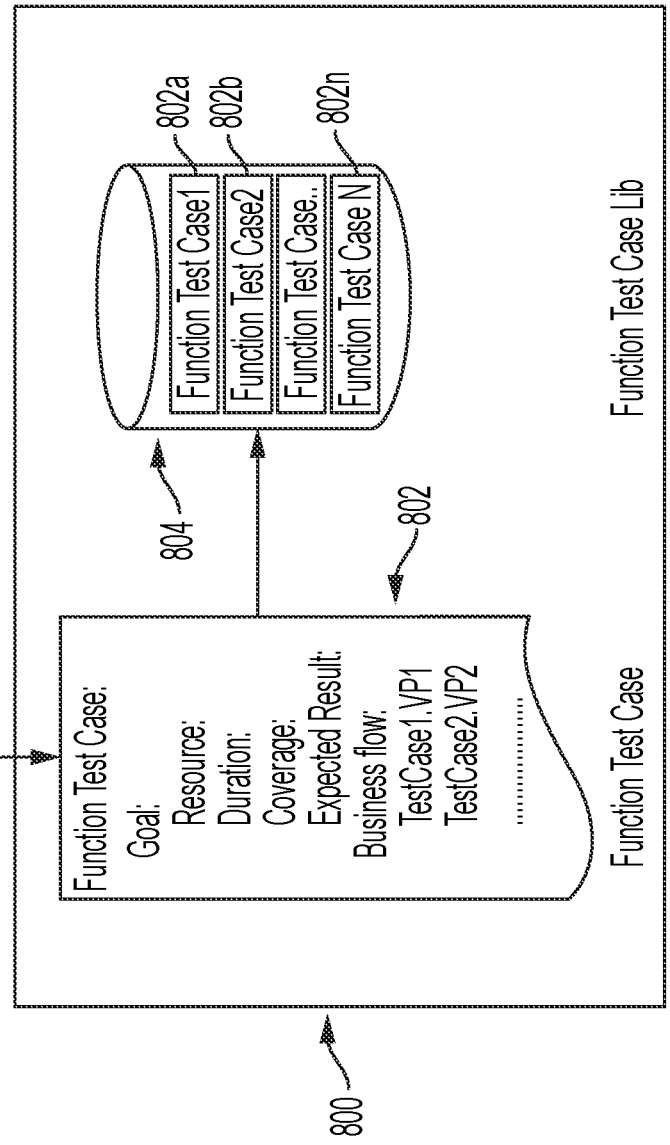
FIG. 6B illustrates a functional test case module included in the objective-driven test case generation system according to a non-limiting embodiment of the present disclosure.

Referring now to FIGS. 6A and 6B, the tailoring module 700 and the functional test case module 800 are illustrated in greater detail according to a non-limiting embodiment of the present disclosure. The tailoring module 700 is in signal communication with the atomic test case module 500 and the test data module 600. The tailoring module 700 is configured to generate a linked test case data 702 in response to performing a linking operation to link (e.g., merge) the test steps 604a-604n included in the test data 606 with one or more atomic test cases 508a, 508b, etc., included in the atomic test case library 510. In one or more non-limiting embodiments, each atomic test case 508a-508n obtained from the atomic test case library 510 is assigned a class name (ClassA, ClassB . . . ClassN), which corresponds to an object (e.g., ObjectID) of a respective test step included in the test data.

The correlation between the class of the an atomic test case and an object of the test step allows the tailoring module 700 to link the test steps 604a-604n with one or more atomic test cases 508a, 508b, and facilitate an objective-driven functional test case, which is described in greater detail below. For example, the linking operation performed by the tailoring module 700 includes determining one or more objective-driven functional test case steps based on a comparison between the ObjectID of a given test step and a class name (ClassN) of the obtained atomic test cases. As described herein, the linked test case data 702 includes atomic test case goals and/or verification points of an atomic test case that are assigned to the test point data of the test step having an object (ObjectID) that corresponds to the atomic test case class name (ClassN). Accordingly, the tailoring module 700 can generate the linked test case data 702 by linking (e.g., combining) test point data (e.g., test steps) with atomic test case goals and/or verification points of a corresponding atomic test case.

With continued referenced to FIG. 6B, the functional test case module 800 is in signal communication with the tailoring module 700 and is configured to generate an objective-driven functional test case 802 based on the linked test case data 702. In one or more non-limiting embodiments of the present disclosure, the functional test case module 800 automatically determines one or more system-defined goals having an expected result to be verified and automatically determines a business flow based on the atomic test cases obtained according to the objects of the test steps included in the test data. Accordingly, the objective-driven test case generation system 400 (e.g., the functional test case module 800) can execute the object-driven function test case 802 to generate test case results (e.g., results indicating whether the system-defined goals have been verified and satisfy expected results) and can automatically update the object-driven function test case based on the test case results.

The functional test case module 800 is also configured to manage a plurality of objective-driven functional test cases 802a, 802b, 802n received from the tailoring module 700. In one or more non-limiting embodiments, the functional test case module 800 manages the objective-driven functional test cases 802a, 802b, 802n by populating a functional test case library 804 that includes a plurality of objective-driven functional test cases 802a, 802b, 802n. Accordingly, the functional test case module 800 can execute one or more of object-driven function test case 802 stored in the functional test case library to generate test case results, automatically update the functional test case based on the test results, and store the updated functional test case in the functional test case library 804. In this manner, the functional test case library 804 can be automatically and actively updated when one or more of the system-defined goals do not meet expected results, and can actively maintain an up-to-date functional test case library 804.

Figure 7:
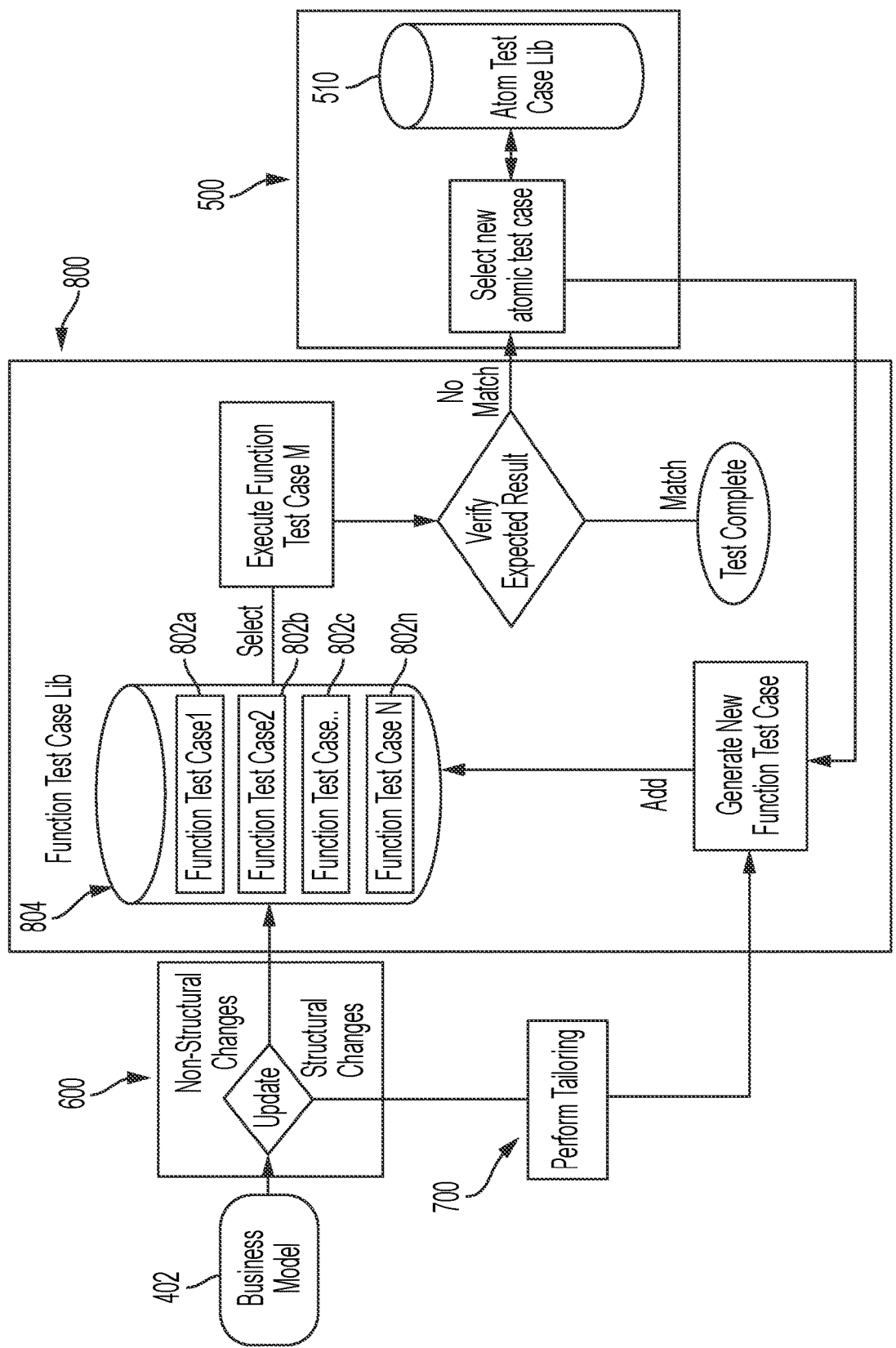
FIG. 7 is a block diagram depicting a workflow process of updating an objective-driven functional test case according to a non-limiting embodiment of the present disclosure.

Turning to FIG. 7, for example, a workflow process for updating an objective-driven functional test case is illustrated according to a non-limiting embodiment of the present disclosure. The workflow processes for automatically updating the functional test case library 804 include, but are not limited to, analyzing by the test data module 600 a business model 402 input to the objective-driven test case generation system 400, and determining by the test data module 600 that the business model 402 includes structural changes. Non-structural changes refer to elements of the workflow business model that do not change, and therefore allow for reusing an existing function test case. Structural changes, however, refer to elements of the workflow business model that change, therefore require changing the entire workflow. Thus, when a structural change occurs, the system 400 generates a new function test case using a selected atomic test case as described herein.

When the business model 402 includes structural changes, it is delivered to the tailoring module 700. Accordingly, the tailoring module 700 performs the linking operations based on the structural changes to generate linked test case data as described herein. The linked test case data is then delivered to the functional test case module 800, which generates a new objective-driven functional test case based on the linked test case data. Accordingly, the new objective-driven functional test case 802 is stored in the function test case library 804.

With continued reference to FIG. 7, and pre-existing objective-driven functional test 802 or the new objective-driven functional test case 802 can be executed to verify whether its test results match or satisfy corresponding expected test result. For example, the functional test case module 800 can access the functional test case library 804 to retrieve the objective-driven functional test case 802 that corresponds to the input business model 402. The functional test case module 800 then executes the objective-driven functional test case 802 to obtain test case results, and compares the test case results to expected results. The functional test case module 800 verifies that the objective-driven functional test case achieves the system-defined goals when the test case results match the expected results, and verifies that the objective-driven functional test case fails to achieve one or more of the system-defined goals when the test case results do not match the expected results.

When the actual results match the expected results, the test is completed. When, however, the actual results do not match the expected results, the functional test case module 800 communicates with the 500 and requests a new atomic test case. Accordingly, the atomic test case module 500 obtains a new atomic test case module 500 from the atomic test case library 510 and delivers it to the functional test case module 800. The functional test case module 800 updates the functional test case library 804 with the new atomic test case and/or executes the new atomic test case to obtain new actual results. Accordingly, the functional test case module 800 verifies the actual results to expected results and either completes the test when the results match or requests another new atomic test case if the results do not match.

Figure 8:
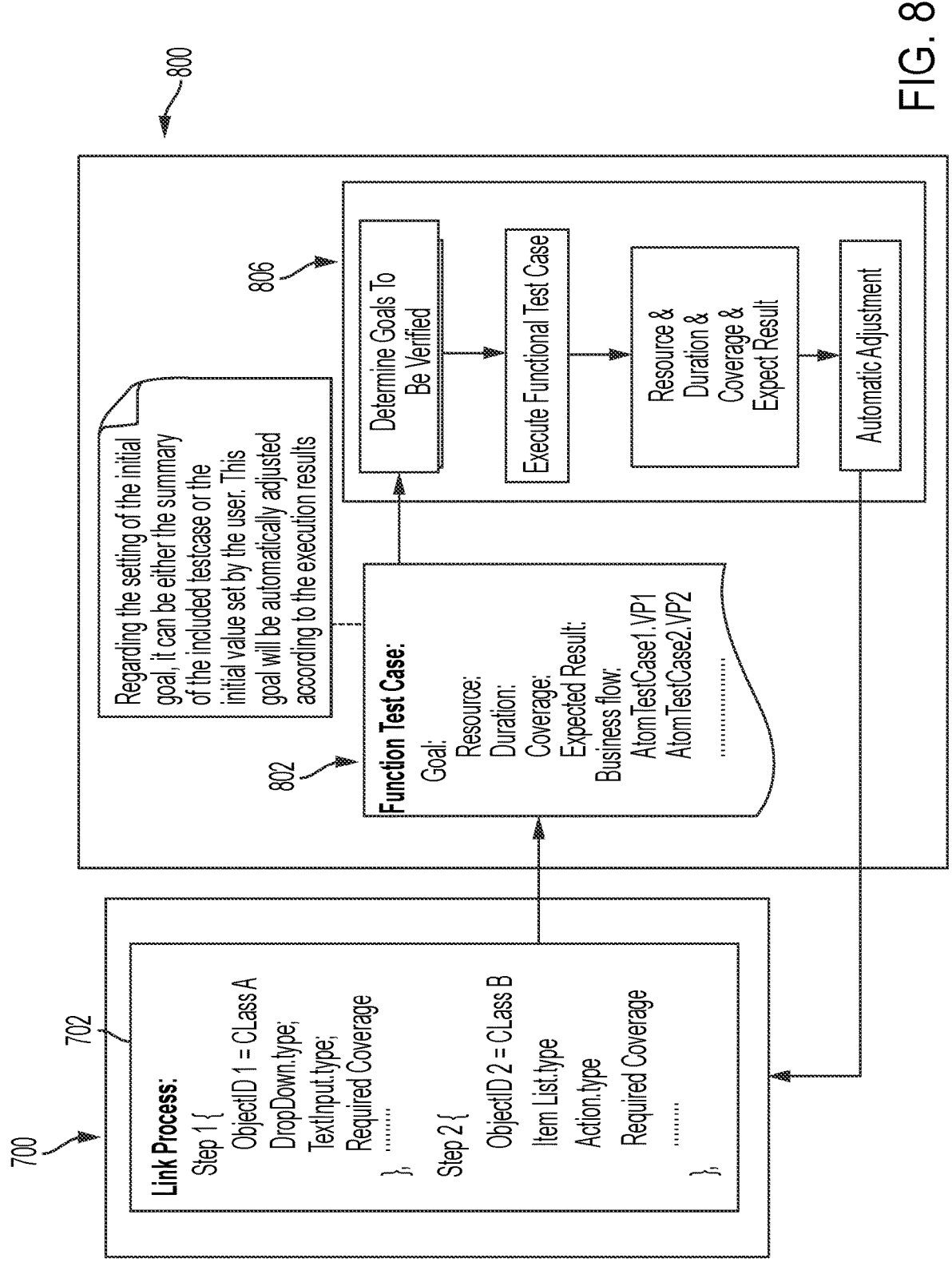
FIG. 8 is a block diagram depicting a workflow process of automatically adjusting an objective-driven functional test case to achieve the defined goals according to a non-limiting embodiment of the present disclosure.

Referring to FIG. 8, a test case adjustment engine 806 included in the functional test case module 800 and configured to actively adjust and modify an atomic test case is illustrated according to a non-limiting embodiment of the invention. The test case adjustment engine 806 is in signal communication with the tailoring module 700 to facilitate the adjustment and modification of an atomic test case with the aim of actively generating an objective-driven functional test case that produces test results that meet or satisfy expected test results.

The test case adjustment engine 806 is configured to automatically perform an adjustment operation for adjusting and modifying an objective-driven functional test case 802 to achieve one or more targeted system-defined goals. The targeted system-defined goals include, for example, each system-defined goal included in the objective-driven functional test case 802 or one or more user-selected goals selected by a user via the I/O interface 125 from among the system-defined goals included in the objective-driven functional test case 802.

As shown in FIG. 8, the test case adjustment engine 806 determines the targeted system-defined goals to be verified, and executes the objective-driven functional test case to obtain test results corresponding to the targeted system-defined goals. The test case adjustment engine 806 then determines whether the test results of the targeted system-defined goals match the expected results of the targeted system-defined goals. When the test results of the targeted system-defined goals do not match the expected results, the test case adjustment engine 806 automatically determines one or more adjusted parameters for adjusting and modifying one or more of the targeted goals that provided test results failing to match the expected results.

With continued reference to FIG. 8, the adjusted parameters are delivered to the tailoring module 700. The tailoring module 700 generates updated linked test case data 702 based on the adjusted parameters and returns the updated linked test case data 702 to the test case adjustment engine 806. Accordingly, the test case adjustment engine 806 generates an updated objective-driven functional test case 802 based on the updated linked test case data 702, and performs the adjustment operations described above on the updated objective-driven functional test case 802. In one or more non-limiting embodiments, the test case adjustment engine 806 can repeat adjustment operations described herein until the results of all the targeted goals match the expected results.

Figure 9:
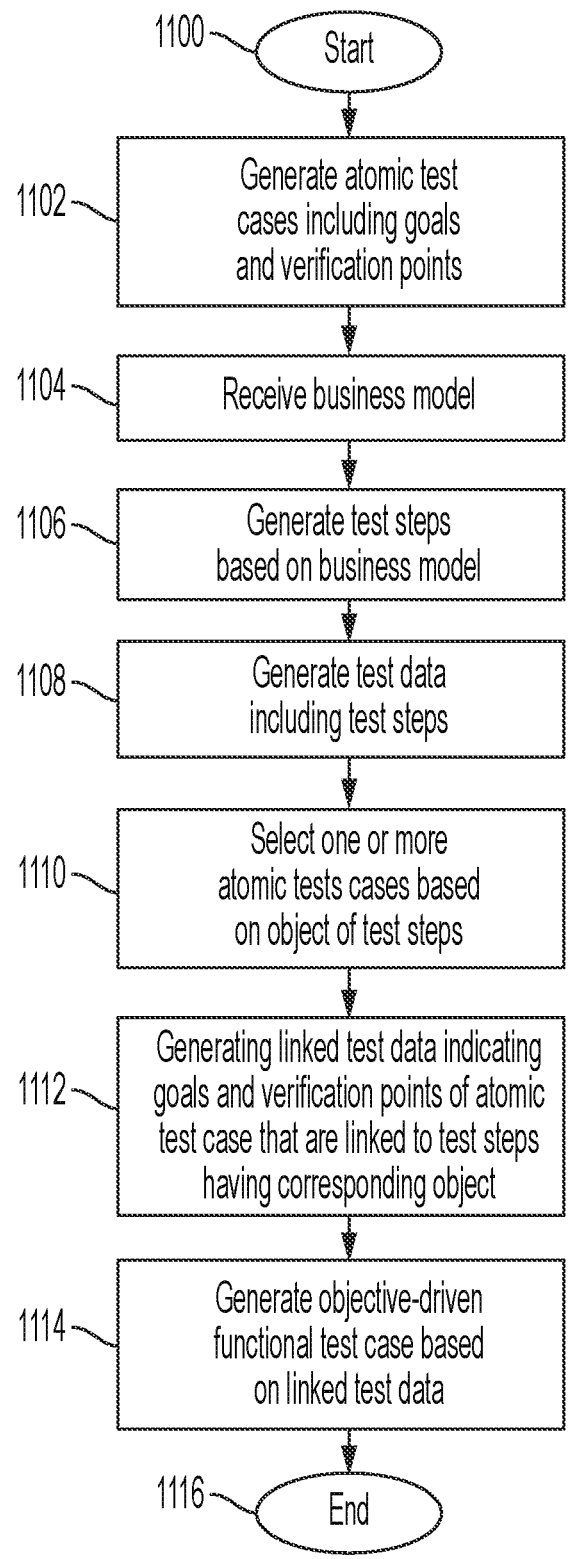
FIG. 9 is a flow diagram illustrating a method of automatically generating objective-driven functional test cases according to a non-limiting embodiment of the present disclosure.

Turning now to FIG. 9, a method of automatically generating objective-driven functional test cases is illustrated according to a non-limiting embodiment of the present disclosure. The method begins at operation 1100 and at operation 1102 an initial atomic test case including one or more goals and/or verification points is generated and stored in an atomic test case library. At operation 1104, a business model is received. At operation 1106, one or more test steps are determined based on the business model, and at operation 1108 test data is generated based on the test steps. At operation 1110, one or more atomic test cases are selected from the atomic test library based on an object (ObjectID) associated with a given test step. At operation 1112, linked test data is generated. The linked test data indicates (i.e., "links") the goals and/or verification points of an atomic test case to test steps with a corresponding object (ObjectID). At operation 1114, an object-driven functional test case is generated based on the linked test data, and the method ends at operation 1116.

Figure 10:
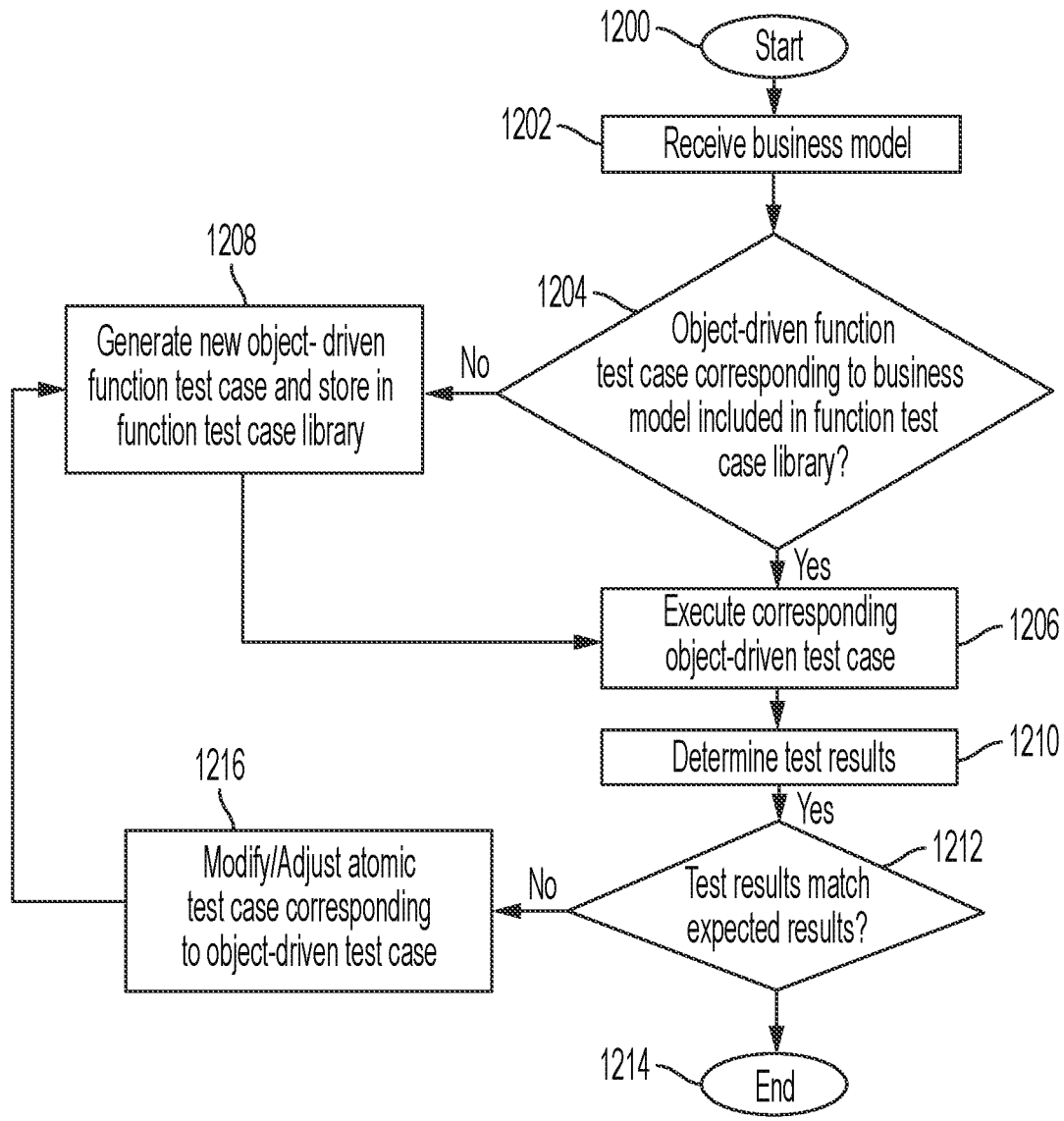
FIG. 10 is a flow diagram illustrating a method of updating an objective-driven functional test cases according to a non-limiting embodiment of the present disclosure.

FIG. 10 illustrates a method of updating an objective-driven functional test cases according to a non-limiting embodiment of the present disclosure. The method begins at operation 1200, and a business model is received at operation 1202. At operation 1204, a determination is made as to whether an object-driven functional test case corresponds to a business model included in the functional test case library. When the functional test case library includes an object-driven functional test case that corresponds to the business model, the corresponding object-driven functional test case is retrieved and executed.

When, however, the functional test case library excludes an object-driven functional test case that corresponds to the business model, the a new object-driven functional test case is generated and stored in the functional test case library at operation 1208. Accordingly, the new object-driven functional test case is executed at operation 1206.

At operation 1210, test results are determined in response to executing the object-driven functional test case. At operation 1212, a determination is made as to whether the test results match expected test results of the executed object-driven functional test case. When the test results match the expected test results, the method ends at operation 1214.

When, however, the test results do not match the expected test results, the atomic test case corresponding to the executed object-driven functional test case is modified or adjusted at operation 1216, and a new object-driven functional test case is generated based on the adjusted atomic test case at operation 1208. Accordingly, operations 1206-1212 can be repeated until the test results match the expected test results and the method ends at operation 1214.

As described herein, one or more non-limiting embodiments of the present disclosure provide an objective-driven functional test case generation system configured to build objective-driven test cases and test suites. The objective-driven test case generation system described herein is capable of automatically updating goals of an objective-driven functional test case to generate an updated objective-driven functional test case and to automatically verify the goals and adjust the functional test case to achieve the goals. In this manner, the objective-driven test case generation system is capable of increasing the reuse rate of test cases and the efficiency of test execution, while reducing the effort required to create test cases larger test case suites.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each process in the workflow, each block in the flowchart and/or each block in the block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An objective-driven test case generation system comprising:
    an atomic test case controller configured to generate a plurality of atomic test cases and store the plurality of atomic test cases in an atomic test case library;
    a test data controller configured to receive an input business model, to determine one or more test steps from the input business model, and to generate test data including the one or more test steps;
    a tailoring controller in signal communication with the atomic test case controller and the test data controller, the tailoring-controller configured to perform a linking operation to link the one or more test steps included in the test data with one or more atomic test cases included in the atomic test case library to generate linked test case data; and
    a functional test case-controller in signal communication with the tailoring controller and configured to generate an objective-driven functional test case based on the linked test case data,
    wherein the functional test case controller automatically determines one or more system-defined goals having an expected result to be verified, and automatically determines a business flow based on the plurality of atomic test cases obtained according to an object of the one or more test steps included in the test data, and
    wherein the functional test case controller executes the objective-driven functional test case to obtain test case results, compares the test case results to the one or more system-defined goals having expected results, and, in response to determining that the test case results do not match the expected results, automatically adjusts the objective-driven functional test case based on one or more updated atomic test cases or adjusted parameters to regenerate the objective-driven functional test case until the test case results match the expected results.

2. The objective-driven test case generation system of claim 1, wherein the objective-driven test case generation system is configured to execute the object-driven functional test case to generate the test case results and automatically update the objective-driven functional test case based on the test case results.

3. The objective-driven test case generation system of claim 2, wherein the functional test case controller is configured to obtain the object-driven functional test case from a functional test case library, perform the automatic update of the object-driven functional test case, and update the functional test library in response to storing the updated objective-driven functional test case therein.

4. The objective-driven test case generation system of claim 1, wherein each test step included in the test data corresponds to a respective object indicated by an ObjectID, and each standard atomic test case in the atomic test case library is mapped to the ObjectID of the corresponding test step included in the test data.

5. The objective-driven test case generation system of claim 4, wherein the linking operation includes determining one or more objective-driven functional test case steps based on a comparison between the ObjectID of a given test step and a class name (ClassN) of the atomic test cases, and generating the linked test case data by linking the test steps with one or both of atomic test case goals and verification points of a corresponding atomic test case.

6. The objective-driven test case generation system of claim 5, wherein the linked test case data includes one or both of the atomic test case goals and the verification points of the atomic test case that are assigned to a test point data of the test step having the object (ObjectID) that corresponds to the atomic test case class name (ClassN).

7. A method of generating an objective-driven test case, the method comprising:
    generating, by an atomic test case controller, a plurality of atomic test cases and storing the plurality of atomic test cases in an atomic test case library;
    inputting a business model to a test data controller;
    determining by the b test data controller one or more test steps from the business model and generating by the test data controller test data including the test steps;
    performing, by a tailoring controller in signal communication with the atomic test case controller and the test data controller, a linking operation to link the one or more test steps included in the test data with one or more atomic test cases included in the atomic test case library to generate linked test case data;
    generating, by a functional test case controller in signal communication with the tailoring controller, an objective-driven functional test case based on the linked test case data;
    automatically determining, by the functional test case controller, one or more system-defined goals having an expected result to be verified; and
    automatically determining, by the functional test case controller, a business flow based on the plurality of atomic test cases obtained according to the object of the test steps included in the test data;

executing, by the functional test case controller, the objective-driven functional test case to obtain test case results and comparing the test case results to the one or more system-defined goals having expected results; and in response to determining that the test case results do not match the expected results, automatically adjusting the objective-driven functional test case based on one or more updated atomic test cases or adjusted parameters to regenerate the objective-driven functional test case until the test case results match the expected results.

8. The method of claim 7, wherein the method further comprises:
executing the objective-driven functional test case to generate the test case results; and
automatically updating the objective-drive functional test case based on the test case results.

9. The method of claim 8, further comprising:
obtaining, by the functional test case controller, the object-driven functional test case from a functional test case library;
performing the automatic update of the object-driven functional test case; and
updating the functional test library in response to storing the updated objective-driven functional test case therein.

10. The method of claim 7, wherein each test step included in the test data corresponds to a respective object indicated by an ObjectID, and each standard atomic test case in the atomic test case library is mapped to the ObjectID of the corresponding test step included in the test data.

11. The method of claim 10, wherein the linking operation further comprises:
determining one or more objective-driven functional test case steps based on a comparison between the ObjectID of a given test step and a class name (ClassN) of the atomic test cases; and
generating the linked test case data by linking the test steps with one or both of atomic test case goals and verification points of a corresponding atomic test case.

12. The method of claim 11, wherein the linked test case data includes one or both of the atomic test case goals and the verification points of the atomic test case that are assigned to a test point data of the test step having the object (ObjectID) that corresponds to the atomic test case class name (ClassN).

13. A computer program product to control a processor to generate an objective-driven test case, the computer program product comprising a computer readable storage medium having program instructions embodied therewith, the program instructions executable by an electronic computer processor to control the processor to perform operations comprising:
generating, by an atomic test case controller, a plurality of atomic test cases and storing the plurality of atomic test cases in an atomic test case library;
inputting a business model to a test data controller;
determining by the test data controller one or more test steps from the business model and generating by the test data controller test data including the test steps;
performing, by a tailoring controller in signal communication with the atomic test case controller and the test data controller, a linking operation to link the one or more test steps included in the test data with one or more atomic test cases included in the atomic test case library to generate linked test case data; and
generating, by a functional test case controller in signal communication with the tailoring controller, the objective-driven functional test case based on the linked test case data;
automatically determining, by the functional test case controller, one or more system-defined goals having an expected result to be verified;
automatically determining, by the functional test case controller, a business flow based on the plurality of atomic test cases obtained according to the object of the test steps included in the test data;
executing, by the functional test case controller, the objective-driven functional test case to obtain test case results and comparing the test case results to the one or more system-defined goals having expected results; and
in response to determining that the test case results do not match the expected results, automatically adjusting the objective-driven functional test case based on one or more updated atomic test cases or adjusted parameters to regenerate the objective-driven functional test case until the test case results match the expected results.

14. The computer program product of claim 13, wherein the method further comprises:
executing the object-driven functional test case to generate the test case results; and
automatically updating the objective-driven functional test case based on the test case results.

15. The computer program product of claim 14, further comprising:
obtaining, by the functional test case controller, the object-driven functional test case from a functional test case library;
performing the automatic update of an object-driven functional test case; and
updating the functional test library in response to storing the updated objective-driven functional test case therein.

16. The computer program product of claim 13, wherein each test step included in the test data corresponds to a respective object indicated by an ObjectID, and each standard atomic test case in the atomic test case library is mapped to the ObjectID of the corresponding test step included in the test data.

17. The computer program product of claim 16, wherein the linking operation further comprises:
determining one or more objective-driven functional test case steps based on a comparison between the ObjectID of a given test step and a class name (ClassN) of the atomic test cases; and
generating the linked test case data by linking the test steps with one or both of atomic test case goals and verify points of a corresponding atomic test case,
wherein the linked test case data includes one or both of the atomic test case goals and the verification points of the atomic test case that are assigned to a test point data of the test step having the object (ObjectID) that corresponds to the atomic test case class name (ClassN).

* * * * *